United States Patent [19]

Yamanobe et al.

[11] Patent Number: 4,850,681
[45] Date of Patent: Jul. 25, 1989

[54] OPTICAL MODULATION DEVICE

[75] Inventors: Masao Yamanobe, Machida; Yasuyuki Watanabe; Hajime Sakata, both of Hiratsuka; Yukitoshi Ohkubo, Yokohama; Tomoyuki Umezawa, Hiratsuka; Chiori Mochizuki, Yokohama; Kazuya Ishiwata, Yokosuka; Takayuki Ishii, Hiratsuka; Akihiko Nagano, Kawasaki; Etsuro Kishi, Yokohama; Ryoji Fujiwara, Kamakura, all of Japan

[73] Assignee: Canon Kabushiki Kaisha, Tokyo, Japan

[21] Appl. No.: 33,773

[22] Filed: Apr. 3, 1987

[30] Foreign Application Priority Data

Apr. 7, 1986 [JP] Japan ................................. 61-80607
Apr. 9, 1986 [JP] Japan ................................. 61-82922
Apr. 10, 1986 [JP] Japan ................................ 61-82521
Jun. 12, 1986 [JP] Japan ............................... 61-135034

[51] Int. Cl.$^4$ ............................................. G02F 1/13
[52] U.S. Cl. ............................... 350/348; 350/347 V; 350/334

[58] Field of Search ............... 353/347 V, 348, 339 R, 353/334; 350/347 V, 348, 339 R, 334

[56] References Cited

U.S. PATENT DOCUMENTS

| 4,251,137 | 2/1981 | Knop et al. | 350/347 V |
| 4,325,903 | 4/1982 | Wissburn et al. | 528/176 |
| 4,384,016 | 5/1983 | Ide et al. | 428/1 |
| 4,469,408 | 9/1984 | Kruger et al. | 350/339 R |
| 4,725,460 | 2/1988 | Matsuo et al. | 428/1 |
| 4,729,640 | 3/1988 | Sakata | 350/348 |

FOREIGN PATENT DOCUMENTS 0086727 5/1986 Japan ................................. 350/334

Primary Examiner—Stanley D. Miller
Assistant Examiner—Anita E. Pellman
Attorney, Agent, or Firm—Fitzpatrick, Cella, Harper & Scinto

[57] ABSTRACT

An optical modulation device for effecting optical modulation by controlling the diffraction phenomenon of light, which not only consumes a small amouhnt of the driving energy employed, such as a electric power, but which is also capable of improvements in reliability.

8 Claims, 5 Drawing Sheets

OPTICAL MODULATION DEVICE

BACKGROUND OF THE INVENTION

1. Field of the Invention

The present invention relates to an optical modulation device for effecting modulation by causing light to undergo a desired diffraction phenomenon.

In particular, the present invention relates to an optical modulation device for effecting modulation by changing the characteristics of a diffraction grating composed of a specific substance and a substance whose refractive index can be varied so as to control the refractive index of the substance whose refractive index can be varied.

2. Related background Art

One conventionally well-known optical modulation device is a liquid crystal display device of the so-called TN (twist nematic) type which comprises a pair of polarizing plates disposed such that their polarizing directions are orthogonal to each other having a device disposed between the pair of polarizing plates having a liquid crystal sealed therein. An orientation treatment is given so that the polarizing directions become perpendicular to the respective opposed surfaces of a pair of transparent substrates to effect switching of the state of orientation of the liquid crystal between a twisted state and a state of being oriented perpendicular to the substrate surfaces. Since this type of display device has a simple arrangement and it is easy to drive the same, it is used in a wide range of applications. However, since the transmission and attenuation of a luminous flux is effected by two polarizing plates, the rate of the transmittance at the time of color extinction (i.e., at the time of light transmission) is poor. Therefore, it cannot be said that this type of optical modulation device is favorable in terms of the efficiency of utilizing a luminous flux.

Another display device of the same type which makes use of a liquid crystal is called a guest-host mode liquid crystal display device, which is used after mixing pigments in the molecules of the liquid crystal. With this display device, the rate of transmittance at the time of color extinction is at best 75% or thereabout due to the inclusion of pigments.

Meanwhile, a display device or a variable color subtractive filter element which combines a reflection or transmission-type phase diffraction grating and a liquid crystal is disclosed, inter alia, in Japanese Patent Examined Publication No. 3928/1978 and U.S. Pat. No. 4,251,137. Although the devices disclosed therein excel in the efficiency with which they utilize a luminous flux, the device disclosed in Japanese patent Examined Publication No. 3928/1978 merely exhibits a decoration effect, so it has been unsatisfactory as a display device for displaying characters and images or as an optical modulation device for effecting transmission and cutting off of a luminous flux. In addition, the variable subtractive color filter element disclosed in U.S. Pat. No. 4,251,137 is arranged such that a diffraction grating is formed by an isotropic material in such a manner that the directions of orientation become perpendicular to each other with respect to a pair of opposed substrate surfaces. A liquid crystal is disposed between these substrates, and its refractive index is changed by controlling the state of orientation of the molecules of the liquid crystal, thereby changing any difference of the refractive indices between the liquid crystal and the substance constituting the diffraction grating so as to make the spectral transmittance characteristics variable. Thus, this variable subtractive color filter element excels in the efficiency with which it utilizes a luminous flux and exhibits high performance as a variable color filter. With this type of optical modulation device using a conventional diffraction grating, however, since the liquid crystal is orientated homogenously, an incident beam of light is diffracted in a static state, so that, when it is actually used as a display device, it has been necessary to constantly apply a voltage or the like in order to maintain a non-display state, i.e., one allowing all the incident luminous fluxes to be transmitted therethrough (i.e., a normally closed state). Accordingly, these prior art display devices have experienced certain problems such as the large amount of power that is consumed and a substantial decline in reliability.

SUMMARY OF THE INVENTION

Accordingly, it is a primary object of the present invention to provide an optical modulation device for effecting optical modulation by controlling the diffraction phenomenon of light which not only consumes a small amount of the driving energy employed, such as electric power, but which is also capable of providing improved reliability.

To this end, an optical modulation device in accordance with the present invention comprises: a pair of substrates; a diffraction grating disposed of at least one of the opposing surfaces of the pair of substrates; a liquid crystal disposed in grooves of the diffraction grating; and a control member for controlling the state of orientation of the liquid crystal, wherein said optical modulation device is characterized that substantially all incident beams of light are transmitted through the control member in a static state, i.e., one in which no energy is supplied thereto.

In addition, according to one aspect of the invention, there is provided an optical modulation device comprising: a pair of substrates; a diffraction grating disposed on at least one of the opposed surfaces of the pair of substrates; a variable refractive index substance for filling the gap between the refraction grating and the substrates; and a control member for controlling the variable refractive index substance, wherein said optical modulation device is characterized that the diffraction grating is constituted by a liquid crystal polymer material In addition, according to another aspect of the invention, there is provided an optical modulation device comprising: a phase-type diffraction grating constituted by a relief pattern, a liquid crystal filled in grooves of the diffraction grating; and a control member for controlling the state of orientation of the liquid crystal, the control member being formed on a side wall of the relief pattern constituting the diffraction grating.

Furthermore, according to still another aspect of the invention, there is provided an optical modulation device comprising a phase diffraction grating in which a liquid crystal provided between higher and lower substrates provided with a plurality of stripe-like electrodes thereon forms a periodic distribution of the refractive index upon application of a voltage thereto, wherein a liquid crystal phase corresponding to each of the stripe-like electrodes is partitioned from an adjacent liquid phase by means of partition walls.

The above and other features of the present invention will become clear from the following detailed description of the present invention when read in conjunction with the accompanying drawings.

DETAILED DESCRIPTION OF THE PREFERRED EMBODIMENTS

Figure 1:
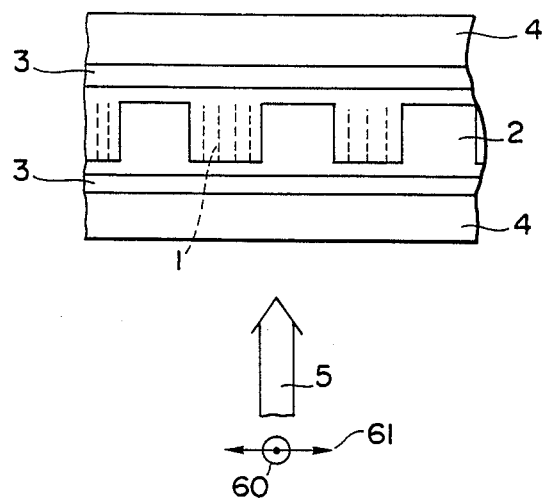
FIG. 1 is a schematic cross-sectional view of a basic arrangement of an optical modulation device in accordance with the present invention, and also serves as an explanatory diagram illustrating the basic principle of optical modulation of this optical modulation device.

FIG. 1 shows a basic arrangement of an optical modulation device in accordance with the present invention, and also serves as an explanatory diagram illustrating the function of this optical modulation device. In the drawing, reference numeral 1 denotes a substance having a variable refractive index, typical of which is a liquid crystal; 2, a diffraction grating constituted by a substance that is transparent with respect to a wavelength used; 3, a transparent electrode; 4, a transparent substrate constituted by a transparent optical member; 5, an incident beam of light having desired polarizing characteristics; 60 and 61, arrows indicating the polarizing directions of polarizing components of the incident beam of light 5 that are perpendicular to each other, 60 denoting the direction perpendicular to the side surfaces of the aforementioned component parts and 70 denoting the polarizing direction parallel with the side surfaces thereof.

This optical modulation device is arranged such that the transparent electrode 3 is formed on each of the opposed surfaces of the pair of transparent substrates 4. The phase-type diffraction grating 2 having a rectangular relief pattern is constituted by a transparent substance provided on one of the transparent electrodes 3 on the pair of transparent substrates 4 and the variable refractive index substance 1 is disposed in each of the grooves (recesses) of the diffraction grating 2. In addition, as for the variable refractive index substance 1, its refractive index is made variable upon the application of an electric field thereto via the transparent electrodes 3.

Referring now to FIG. 1, description will be made of the basic principle of this optical modulation device. To facilitate description, however, the variable refractive index substance 1 will be referred to as a liquid crystal 1, and the refractive index of the liquid crystal 1 is varied by controlling the oriented state of the liquid crystal 1 so as to bring about a predetermined diffraction action.

In addition, it is assumed that the liquid crystal 1 used in this embodiment has negative dielectric isotropy.

In the static state in which no electric field is applied, as shown in FIG. 1, the liquid crystal is oriented in the direction perpendicular to the plane in which the diffraction grating 2 is arranged, i.e., in the vertical direction as viewed in FIG. 1, and maintains a state of homeotropic orientation. Accordingly, a polarizing component 60, 61 of the incident beam of light 5 having desired polarizing components and made incident upon this optical modulation device in this static state is sensitive to a normal refractive index $n_0$ of the liquid crystal 1.

Here, if it is assumed that the refractive index of the substance constituting the diffraction grating 2 is $n_g$, that the wavelength of the incident beam of light 5 is $\lambda$, and that the thickness of the diffraction grating is T, in the case of the rectangular-shaped diffraction grating, the zero-order transmitted and diffracted light with respect to the respective polarizing components 60, 61 of the incident beam of light 5 can be virtually expressed by the following Formula (1).

$$\eta_0 \simeq \frac{1}{2}\left\{ 1 + \cos\left(\frac{2\pi \Delta n T}{\lambda}\right) \right\} \tag{1}$$

where $\Delta n$ is the difference between the refractive index $n_g$ of the diffraction grating 2 and the refractive index n ($n_e \leq n \leq n_0$) of the liquid crystal 1. In addition, $n_e$ is an abnormal refractive index of the crystal 1.

Accordingly, from Formula (1), when $\Delta n = 0$, the diffraction index $\eta_0$ of the zero-order transmitted and diffracted light becomes $\eta_0 = 1$. Meanwhile, when $$\Delta n T = (m + \tfrac{1}{2})\lambda \quad (m = 0, 1, 2, 3, \ldots) \tag{2}$$

the diffraction efficiency $\eta_0$ becomes zero.

Then, it is assumed that, when an electric field is applied to the liquid crystal 1 via the transparent electrodes 3, the direction of orientation (the direction of the optical axis) of the liquid crystal 1 gradually changes. The polarizing component 61 of the incident beam of light 5 constantly senses the normal refractive index $n_0$ of the liquid crystal 1 regardless of the application of an electric field, while the polarizing component 60 senses a synthetic refractive index $n_\theta$ n which an abnormal refractive index $n_e$ and normal refractive index $n_0$ of the liquid crystal 1 are synthesized at a predetermined ratio. It goes without saying that the synthetic refractive index $n_\theta$ changes with a change in the direction of orientation of the liquid crystal 1. If the amount of an electric field is further increased, the liquid crystal 1 is oriented parallel with the direction of the substrates 4 (the transparent electrodes 3) and the grating grooves, thereby assuming a state of homogenous orientation.

At that time, of the polarizing components 60, 61 of the incident beam of light 5, the polarizing component 61 which is perpendicular to the direction of orientation of the liquid crystal 1 senses the normal refractive index $n_0$ of the liquid crystal 1, while the polarizing component 60 which is a component parallel with the direction of orientation of the liquid crystal 1 senses the abnormal refractive index $n_e$ of the liquid crystal 1.

Incidentally, in this state as well, the incident beam of light 5 is modulated in accordance with formula (1).

Here, if it is assumed that $n_g = n_0$, from Formula (1), the polarizing components 60, 61 of the incident beam of light 5 in the static state assume a non-diffraction (i.e., an all-transmissive) state.

Meanwhile, in the state of saturation by applying an electric field, the polarizing component 61 of the components 60, 61 assumes a non-diffraction (i.e., a transmissive) state, while the polarizing component 60 assumes a diffractive state.

Thus a normally open state is theoretically attained through the aforementioned arrangement.

As described above, in order to attain a normally open state regardless of the polarizing condition of the incident beam of light, it is essential to set the variable refractive index substance displaying double refraction characteristics, such as a crystal, in the state in which it exhibits isotropy with respect to an incident beam of light in the static state.

Description will be described hereafter of a specific example of an optical modulation device in accordance with an embodiment of the present invention. Using a pair of normal glass substrates, a transparent electrode such as ITO was formed on one surface of the respective glass substrates. As an orienting agent, an ethanol solution of 0.5 wt % of octadecytriethoxy silane was applied to the respective ITO surfaces by means of spin coating, and after subjecting the coatings to treatment for one hour at 100° C., the coatings were provided with rubbing treatment. A diffraction grating was formed on one of the substrates provided with rubbing treatment by an electron beam resist, and both substrates were adhered to each other in such a manner that the transparent electrodes will face each other. A nematic liquid crystal, i.e., an Nr liquid crystal was filled in the gap between both substrates, thereby preparing an optical modulation device as shown in FIG. 1.

In the optical modulation device prepared in the manufacturing method as described above, the molecules of the liquid crystal were oriented in the direction of the thickness of the diffraction grating, i.e., perpendicularly of the substrate surfaces, displaying the so-called homeotropic orientation in the static state.

In addition, since the Nr liquid crystal was used, as an electric field was applied, the incident beam of light was modulated, and displayed a predetermined zero-order diffraction color after saturation of the electric field.

It should be noted that the orienting agent used in this embodiment and the degree of orientation treatment were selected in such a manner that it is possible to obtain a restraining force sufficient to overcome the physical orientation-retaining force due to the grooves of the diffraction grating and to forcedly orient the liquid crystal located in the grooves of the diffraction grating from the homogeneous orientation to the homeotropic orientation.

Figure 2:
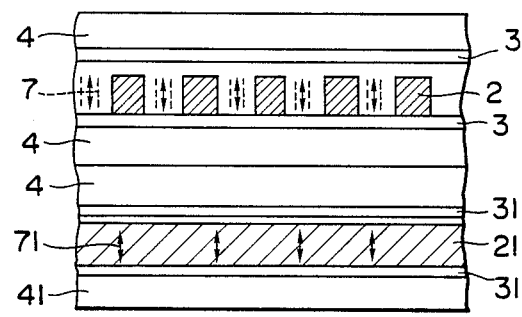
FIG. 2 is a schematic cross-sectional view illustrating an applied form of the optical modulation device in accordance with the present invention.

FIG. 2 is a schematic diagram illustrating in applied form of the optical modulation device in accordance with the present invention. In the drawing, those members that are identical with those of FIG. 1 are denoted by the same reference numerals. In addition, reference numerals 7 and 71 denote the direction of the optical axis of the variable refractive index substance 1, such as a liquid crystal. Furthermore, reference numerals 21 denotes the diffraction grating (not shown); 1, the transparent electrode; and 41, the transparent substrate.

In this embodiment, as shown in U.S. Pat. No. 4,251,137, a device is shown which is arranged such that the diffraction gratings are superposed on each other such that their directions of orientation will become orthogonal to each other, and which is formed by using a pair of the optical modulation devices shown in FIG. 1. Such an arrangement makes it possible to simultaneously modulate the polarizing components 6, 61 of the incident beam of light 5 shown in FIG. 1.

Figure 4A:
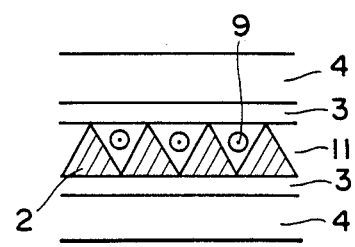
FIGS. 4A, 4B are schematic cross-sectional views illustrating other examples of the configuration of a diffraction grating.
Figure 4B:
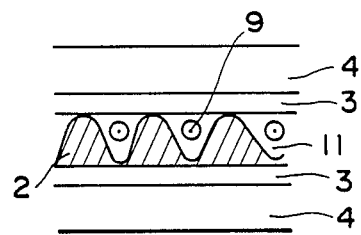

In addition, the configuration of the diffraction grating used in this optical modulation device should not be restricted to a rectangular shape, but various shapes, such as those shown in FIGS. 4A and 4B, may be used. However, the formula of the diffraction efficiency such as the one shown in the aforementioned Formula (1) differs depending on the configuration of the diffraction grating.

As described above, in the optical modulation device in accordance with this embodiment, since a "bright" state, i.e., an all-transmissive state, is obtained when no electric field is applied, while a "dark" state, i.e., a modulated state (a display state), is obtained when an electric field is applied. Therefore, no power is consumed in the normal state (the "bright" state), and the degree of freedom in designing the driving circuit used for driving the device increases.

In addition, the speed of electrolytic corrosion of the transparent electrodes is restarted, and reliability of the device is therefore increased substantially. Accordingly, the range of application of this optical modulation device expands widely, including applications to display devices, color filters, optical switches, and so forth.

Furthermore, the optical modulation device of the invention naturally excels in the efficiency with which it utilizes a luminous flux since a polarizing plate or a light-absorbing substance (e.g., pigment) employed in a conventional display device using a liquid crystal, is not employed.

The diffraction grating constituting the optical modulation device in accordance with the present invention is the so-called phase-type diffraction grating having a relief pattern which is constituted by convexities and concavities, as can be seen from FIG. 1. As a method forming the relief pattern of this type, it is possible to cite various methods, including a method combining photolithography and dry etching, a replica method using a thermosetting resin or an ultraviolet-curing resin, a cutting method using a ruling engine, and an embossing method.

As described above, the optical modulation device in accordance with the present embodiment permits a stabilized non-display state to be realized by obtaining an all-transmissive state in the static state in which no driving energy, such as voltage, is supplied to the device. Hence, it can be suitably used as display devices, color filters, and so forth.

Figure 3A:
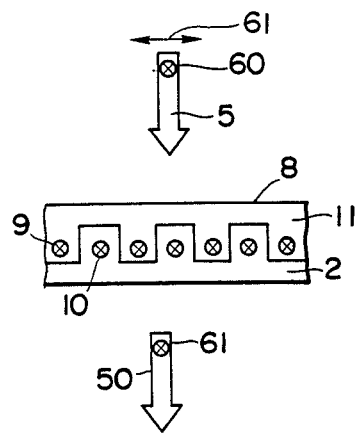
FIGS. 3A, 3B are schematic cross-sectional views illustrating another embodiment of the optical modulation device in accordance with the present invention, and also serve as explanatory diagrams illustrating the basic principle of modulation.
Figure 3B:
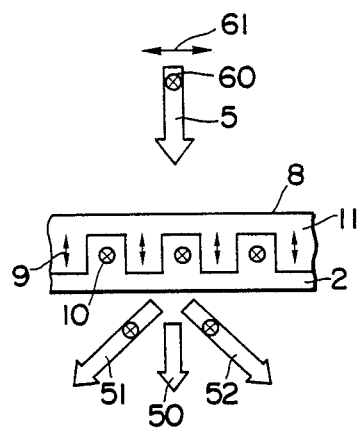

FIGS. 3A, 3B are cross-sectional views of the optical modulation device in accordance with another embodiment of the invention and serve as diagrams explaining the basic principle of operation thereof. FIG. 3A shows a case where no electric field is applied to a nematic liquid crystal, which will be described later, while FIG. 3B shows a case where an electric field is applied thereto.

In the drawings, reference numeral 11 denotes a nematic liquid crystal having positive dielectric anisotropy, while numeral 2 denotes the diffraction grating. A grating member is constituted by these component elements. Provided on the grating member are an insulating film, a transparent electrode, and transparent substrate in the order just mentioned, although they are not shown in the drawings. These elements constitute parts of an optical modulation device 8.

Reference numeral 5 is the incident beam of light, while numerals 50, 51 and 52 denote emergent beams of light.

In this embodiment, the diffraction grating 2 is constituted by a liquid crystal polymer material having a structure substantially similar to that of the liquid crystal 11. The diffraction grating 2 is constituted by, for instance, aromatic copolyester which is a thermoplastic molding material and has optical anisotropy. This diffraction grating is molded by pouring a liquid crystal polymer material, such as aromatic copolyester, in a melted state into a mold of the grating and then by allowing the same to cool. At that time, since the molecular axis of the liquid crystal polymer material is oriented along the grooves of the grating, the diffraction grating 2 per se comes to have optical anisotropy.

In addition, the liquid crystal 11 in the optical modulation device 8 in this embodiment is constituted by a nematic liquid crystal having positive dielectric anisotropy, and has optical anisotropy substantially equivalent to that of the aromatic copolyester which is the material of the diffraction grating 2.

In this embodiment, when no electric field is applied to the liquid crystal 11, as shown in FIG. 2A, the nematic liquid crystal 11 having positive dielectric anisotropy is homogeneously oriented in parallel with the direction of the grooves of the diffraction grating 2.

Now, let us assume that a beam of light 5 which has been polarized in the same direction as that of a director (indicated by an arrow 60) of the liquid crystal 11 is made incident upon the optical modulation device 8. Then, of the incident beam of light 5, the light which has been transmitted through the portions of grooves of the diffraction grating 2 senses the abnormal refractive index $n_e$ of the liquid crystal 12, while the light which has been transmitted through the convex portions of the diffraction grating 2 senses the abnormal refractive index $n_{ge}$ of the diffraction grating 2.

Since the liquid crystal 11 and the diffraction grating 2 are formed by such materials that both of their optical anisotropy will become substantially identical, i.e., since the arrangement is such that $n_e = n_{ge}$, the optical modulation device 8 is regarded as being a substantially isotropic body with respect to the incident beam of light 5. Consequently, the incident beam of light 5 is not diffracted, and is transmitted from the optical modulation device 8 as it is in the form of the emergent beam of light 50. Is other words, in cases where no electric field is applied to the liquid crystal 1, the incident beam of light 5 does not undergo any change and remains in the non-display state. Namely, it is in the normally open state.

Next, in cases where an electric field is applied to the liquid crystal 11 by means of the transparent electrode which is a control member and a part of the control means (not shown), as shown in FIG. 3B, the liquid crystal 11 becomes homeotropically oriented. For this reason, if the beam of light 5 which has been polarized in the same direction as that of the grooves of the diffraction grating 2 is made incident upon the optical modulation device 8, the light which has passed through the portions of the grooves of the diffraction grating 2 senses the normal refractive index $n_0$ of the liquid crystal 11, while the light which has passed the convex portions of the diffraction grating 2 senses the abnormal refractive index $n_{ge}$ of the diffraction grating 2. Since the setting has been such that $n_{ge} \neq n_0$, the grating material constituted by the liquid crystal 11 and the diffraction grating 2 functions as a diffraction grating, and the incident beam of light 5 undergoes diffraction and is made emergent as the emergent beams (diffracted beams) of light 51, 52. In other words, if an electric field is applied to the liquid crystal 11, a directly advancing beam of light ceases to exist in the incident beam of light, so that the display status can be assumed.

Incidentally, in this embodiment, of the incident beam of light made incident upon the optical modulation device 8 after polarizing in the direction perpendicular to the director of the liquid crystal 11, the light passing through the portions of the grooves of the diffraction grating 2 senses the normal diffractive. index $n_0$ of the liquid crystal 1 shortly before and after the application of an electric field to the liquid crystal 11, whereas the light passing through the convex portions of the diffraction grating 2 constantly senses the normal refractive index $n_{g0}$ of the diffraction grating 2 regardless of the presence or absence of the electric field applied to the liquid crystal 1. In this embodiment, since the arrangement is made such that $n_{g0} = n_0$, the grating material fails to function as a diffraction grating, and the beam of light 5 polarized in the direction indicated by an arrow 61 fails to undergo diffraction shortly before and after the application of an electric field to the liquid crystal 1, and is made emergent from the optical modulation device 8 as it is in the form of the emergent beam of light 50. Accordingly, in this embodiment, since the polarizing component in the direction indicated by the arrow 61 cannot undergo optical modulation, use is made of the beam of light 5 polarized in the same direction as that of the director of the liquid crystal 11, as shown by the arrow 60.

FIGS. 4A, 4B are schematic diagrams illustrating other embodiments of the optical modulation device in accordance with the present invention. In the drawings, members that are identical with those shown in FIG. 1 are denoted by the same reference numerals. In addition, reference numeral 9 denotes the direction of the optical axis of the variable refractive index substance, such as a liquid crystal.

Specifically, FIGS. 4A, 4B show devices in which the configuration of the diffraction grating 2 is modified in the optical modulation devices shown in FIGS. 1 to FIGS. 3A, 3B; FIG. 4A shows an optical modulation device having a diffraction grating of a triangular corrugated shape, while FIG. 4B shows one having a diffraction grating of a sine-wave shape.

Thus, as for the configuration of the diffraction grating of this optical modulation device, it is possible to use not only a rectangular shape but also various shapes. The diffraction efficiency, however, varies depending on the configuration of the diffraction grating.

Incidentally, although an optical modulation device of the light-transmissive type is used in this embodiment, it is also possible to use, for instance a reflection-type device by providing a light-reflective film on one substrate. In the case of the reflection type, however, since the behavior of the diffracted light in the device becomes complex, it is desirable to use the light-transmissive-type optical modulation device if design and its actual application to display devices and the like are taken into consideration. In this case, as for the diffraction grating, the variable refractive index substance, the substrates, etc., members having light transmissivity with respect to a wavelength used are employed.

According to this embodiment, at the time of effecting optical modulation by making use of a liquid crystal and a diffraction grating, the diffraction grating is formed by a liquid crystal polymer having optical anisotropy substantially similar to that of a liquid crystal. Therefore, light having desired polarizing characteristics can be made to assume the non-display state, it is possible to attain an optical modulation device which has good efficiency in power consumption and high reliability and is particularly suitable as display devices.

In addition, it is possible to form this diffracting grating readily and accurately as compared with a conventional case in which the diffraction grating is formed by using photo resist or an inorganic material such as $SiO_2$.

Thus, by forming the diffraction grating with a solid substance having optical anisotropy and by disposing a substance having optical anisotropy, such as a liquid crystal, in the grooves of the relief pattern of this diffraction grating, it is possible to arrange an optical modulation device which is capable of attaining a normally open state by a simple arrangement.

Figure 5A:
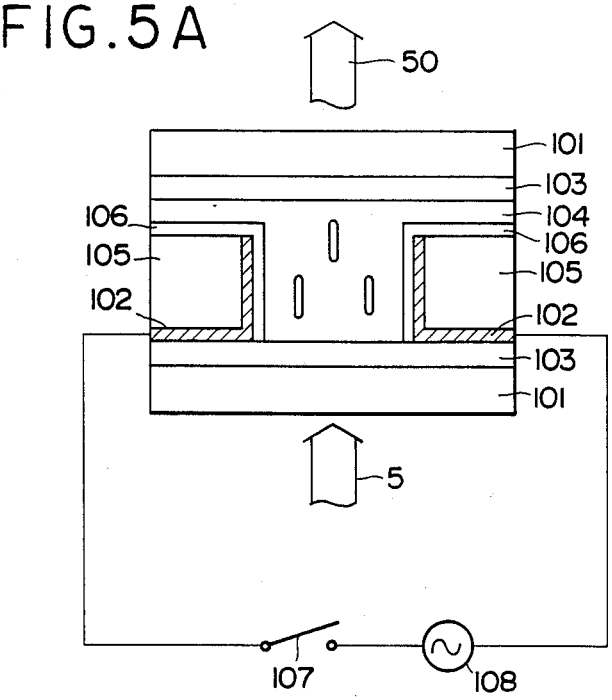
FIGS. 5A, 5B are schematic cross-sectional views illustrating still another embodiment of the optical modulation device in accordance with the present invention, and also serve as explanatory diagrams explaining the basic principle of modulation.
Figure 5B:
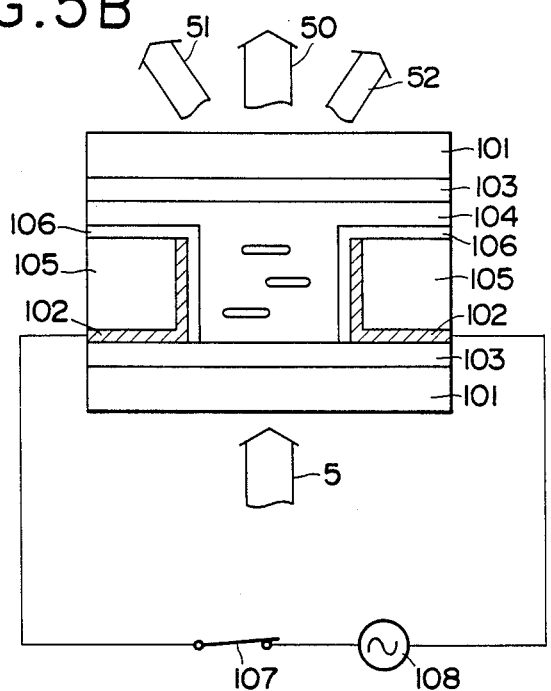

FIGS. 5A, 5B are schematic cross-sectional views illustrating a further embodiment of the optical modulation device in accordance with the present invention. In the drawings, reference numeral 101 denotes a transparent substrate; 102, a transparent electrode; 103, a transparent insulating film; 104, a liquid crystal; 105, a transparent insulating material constituting a diffraction grating; and 106, a transparent protective film which also serves as an insulating film. Numeral 107 denotes a switch; 108, a driving power source; 5, the incident beam of light; 50, zero-order diffracted light; and 51, 52, high-order diffracted light.

FIG. 5A shows a state in which the switch 127 is turned OFF, i.e., no electric field is applied, while FIG. 5B shows a state in which the switch 107 is ON i.e., an electric field is applied. In this embodiment, a positive dielectric nematic liquid crystal 104 is used as the liquid crystal.

The optical modulation device in accordance with this embodiment is arranged as follows: The transparent insulating film is formed on each one surface of the pair of transparent substrates 101, and the rectangular-shaped diffraction grating constituted by the transparent insulating material 105 is formed on the transparent insulating film 103 on one transparent substrate 101. The transparent electrode 102 is formed on the side surface of the diffraction grating and an interface between the transparent insulating film 103 and the diffraction grating. The diffraction grating is covered with the transparent protective film 106. The transparent substrate 101 having the diffraction grating and the other transparent substrate 101 are adhered to each other in such a manner that the transparent protective films 103 will face each other, and the liquid crystal 104 is sealed in the gap portion. Incidentally, the transparent electrodes 102 in adjacent convex portions are connected to the switch 107 via the driving power source 108 via lead wires. Furthermore, the transparent insulating films 103 are provided with vertical orientation treatment, while the molecules of the liquid crystal 104 are oriented vertically, exhibiting the so-called homeotropic orientation.

Description will be made hereafter of the function of this optical modulation device.

In the state shown in FIG. 5A i.e., in the state in which the switch 107 is OFF and no voltage is applied between the transparent electrodes 102, the liquid crystal 104 is homeotropically oriented, as described above, and its longitudinal axis is oriented perpendicularly to the substrates 101. At this time, the incident beam of light 5 senses the normal refractive index $n_0$ of the liquid crystal 104 regardless of its polarizing state. Consequently, if the thickness of the transparent electrode 102 and the transparent protective film 106 is sufficiently smaller than the line width (the width of the convex portion) of the diffraction grating, the incident beam of light 5 passes through this device without stopping and being subjected to diffraction action and emerges as the zero-order emergent beam of light 50 by setting the refractive index $n_g$ of the transparent insulating material 105 as being equal to the normal refractive index $n_0$ of the liquid crystal 104.

On the other hand, in the state shown in FIG. 5B i.e., in the state in which the switch 107 is ON and a predetermined voltages is applied between the transparent electrodes 102, the longitudinal axis of the molecules of the liquid crystal 104 is aligned in the direction of the electric field, and is oriented in the direction parallel with the surfaces of the subjectstes 101 (homogeneous orientation), as shown in FIG. 5B. At this time, of the polarizing components of the incident beam of light 5, the polarizing component in the same direction as the oriented direction of the liquid crystal 104 senses the abnormal refractive index $n_e$ of the liquid crystal 104. Accordingly, if the abnormal refractive index $n_e$ of the liquid crystal 104, the refractive index $n_g$ of the transparent insulating material 105, and the height T of the diffraction grating are set in such a manner that an optical path difference between the optical path of the polarizing component at the time of passing through the liquid crystal 104 and the optical path of the same at the time of passing through the transparent insulating material 105 becomes $\lambda/2$, ($\lambda$ is the wavelength of the incident beam of light) all the incident beams of light 5 are made emergent as high-order diffracted beams of light 51, 52 without becomeing the zero-order emergent beam of light 50. It should be noted that the angles of diffraction of the high-order diffracted beams of light 51, 52 depend upon the wavelength $\lambda$ and the pitches of the diffraction grating.

Namely, the diffraction efficiency $n_0$ of the zero-order transmitted and diffracted beam of light (the emergent beam of light 50 in the drawings) in the rectangular-shaped diffraction grating such as the one shown in FIGS. 5A, 5B can be expressed approximately by the aforementioned Formula (1). Therefore, in order to set the diffraction efficiency $n_0$ of light having the predetermined wavelength $\lambda$ to approximately zero it suffices if the conditions of the aforementioned Formula (2) are satisfied.

Incidentally, in FIG. 5B, of the polarizing component of the incident beam of light 5, the polarizing component polarized in the direction perpendicular to the oriented direction of the liquid crystal 104, i.e., in the direction of the grooves of the diffraction grating, senses the normal diffractive index $n_0$ of the liquid crystal 104 even if the switch 107 is ON and on electric field is thereby applied. Accordingly, this polarizing component of the incident beam of light 5 cannot be modulated by the optical modulation device in accordance with this embodiment. Hence, in order to modulate the incident beam of light having desired polarizing characteristics, it suffices if an arrangement is provided by using two pieces of the device, such as the one shown in FIGS. 5A, 5B, and by superposing the devices on each other in such a manner that the oriented direction of the respective diffraction gratings become perpendicular to each other. Thus, is possible to have the respective superposed devices independently modulate the polarizing components that intersect each other at right angles.

As described above, in the optical modulation device in accordance with this embodiment, since a "bright" state, i.e., an all-transmissive state, is obtained when no electric field is applied, while a "dark" state, i.e., a modulated state (a display state), is obtained when an electric field is applied. Therefore, no power is consumed in the normal state (the "bright" state), and the degree of freedom in designing the driving circuit used for driving the device increases.

In addition, the speed of electrolytic corrosion of the transparent electrodes is retarted, and related ability of the device is therefore increased substantially. Accordingly, the range of application of this optical modulation device expands widely, including applications to display devices, color filters, optical switches, and so forth.

Furthermore, the optical modulation device of the invention naturally excels in the efficiency with which it utilizes a luminous flux since a polarizing plate or a light-absorbing substance such a pigment (employed in a conventional display device using a liquid crystal), is not employed.

The diffraction grating constituting the optical modulation device in accordance with this embodiment is also the so-called phase-type diffraction grating having a relief pattern which is constituted by convexities and concavities, as can be seen from FIGS. 5A, 5B. As a method of forming the relief pattern of this type, it is possible to cite various methods, including a method combining photolithography and dry etching, a replica method using a thermosetting resin or an ultraviolet-curing resin, a cutting method using a ruling engine, and an embossing method.

In addition, although a device having a rectangular diffraction grating is shown in this embodiment, optical modulation is possible whatever the configuration of the diffraction grating. For instance, it is possible to use a diffraction grating of various sizes, including a triangular-wave shape . and a sine-wave shape, as shown in FIGS. 4A, 4B, as well as an asymmetric shape. The angle of separation between the diffracted beams of light depends on the pitch of the diffraction grating and the wavelength of the incident beam of light. The spectral transmittance characteristics of the zero-order transmitted and diffracted beam of light are mainly dependent on the configuration (the waveform profile) of the diffraction grating, its height T, and the difference $\Delta n$ in the refractive index. In other words, the aforementioned Formula (1), which expresses the diffraction efficiency $\eta_0$ of the zero-order transmitted and diffracted beam of light in the rectangular-shaped diffraction grating, cannot be applied to the diffraction efficiency in the triangular-wave- or sine-wave-shaped diffraction grating, and formulae corresponding to the respective configurations of the diffraction gratings are used at the time of designing them.

In addition, although the so-called light-transmissive type optical modulation device is shown in this embodiment, a reflection-type optical modulation device may also be used. In this case, it suffices if an arrangement is provided such that one of the pair of transparent electrodes 103, shown in FIGS. 5A, 5B, is constituted by a member having reflection characteristics in the wavelength (band) used, or a reflecting films provided to the interface between the substrate 10 and the transparent electrode 103, or a reflecting film is formed on the entire surface of the relief pattern having convexities and concavities and constituting the diffraction grating.

Furthermore, the transparent electrode 102 is also formed in the interface with the transparent protective film 103. However, the transparent electrode 102 need not be formed on this interface, and it suffices if a horizontal electric field (an electric field which is parallel with the surfaces of the substrates 1) can be applied to the so-called positive dielectric nematic liquid crystal, such as the device shown in FIGS. 5A, 5B. Accordingly, it suffices if the transparent electrode 102 is formed on the side wall of the transparent insulating material constituting the diffraction grating. In addition, the means for controlling the oriented state of the liquid crystal should not be restricted to an electric field, and it is also possible to employ a controlling means which generates heat, a magnetic field, etc. However, in consideration of the ease of the arrangement of the device and the controlling method as well as response characteristics and the like, control by means of a electric field is most preferable.

As described above, the optical modulation device in accordance with the present embodiment permits a stabilized non-display state to be realized by obtaining an all-transmissive state in the static state is which no driving energy, such as voltage, is supplied to the device. Hence, it can be suitably used as display devices, color filters, and so forth.

The optical modulation device of the foregoing embodiments shown in FIGS. 1 to FIGS. 5A, 5B is arranged by combining the diffraction grating and the variable refractive index substance, such as a liquid crystal.

The optical modulation device is arranged with a liquid crystal diffraction grating such as the one disclosed in U.S. Pat. No. 3,843,231. This liquid crystal diffraction grating is obtained by alternately forming areas having different directions of the optical axis, i.e., states of orientation, by applying a predetermined distribution of an electric field to a liquid crystal layer disposed between a pair of substrates.

In a case where a nematic liquid crystal having positive dielectric characteristics is disposed between upper and lower substrates provided with a plurality of stripe-shaped electrodes and a horizontally-oriented film is formed on the substrates, like the device disclosed in U.S. Pat. No. 3,843,231, in the state in which no electric field is applied, the liquid crystal is oriented in a fixed direction or spirally in the direction parallel with the substrates in correspondence with the direction of orientation by means of the oriented film provided on the substrates, and the liquid crystal displays the abnormal refractive index $n_e$.

If an electric field is applied between the substrates by the stripe-shaped electrodes 2 disposed on the substrates, the liquid crystal becomes oriented perpendicularly of the substrates in compliance with the direction of the electric field, and displays the normal refractive index $n_0$. Since the stripe-shaped electrodes are disposed at regular pitches, the normal refractive index $n_0$ and the abnormal refractive index $n_e$ are distributed at regular periods on application of a voltage, and a wave-form phase diffraction grating is formed.

In such an arrangement, however, there have been a drawback in that the orientation becomes disorderly in the boundary between the normal refractive index $n_0$ and the abnormal refractive index $n_e$ become obsecure, so that the difference in the refractive index becomes small than '$\Delta n = n_e - n_0$', displaying a sine-wave-shaped periodic distribution in which the boundary is not sharp, with the result that the diffraction effect is appreciably undermined. Furthermore, since the pitches of the diffraction grating are restricted by the spread of the electric field, there has been another drawback in that it is impossible to obtain a grating with very small pitches.

The optical modulation devices shown in FIGS. 6 to 9 are capable of overcoming such drawbacks and obtaining a state in which all incident beams of light can be transmitted, i.e., the so-called normally open state, at the time when no electric field is applied.

Figure 6A:
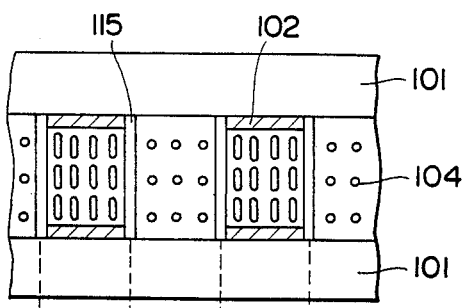
FIG. 6A is a schematic top plan view illustrating a further embodiment of the optical modulation device in accordance with the present invention.
Figure 6B:
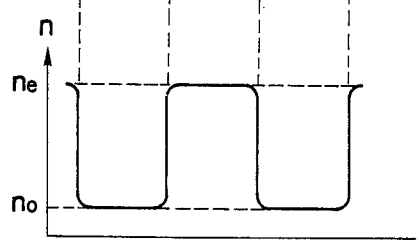
FIG. 6B is a diagram illustrating the distribution of a refractive index in the state shown in FIG. 6A.
Figure 7:
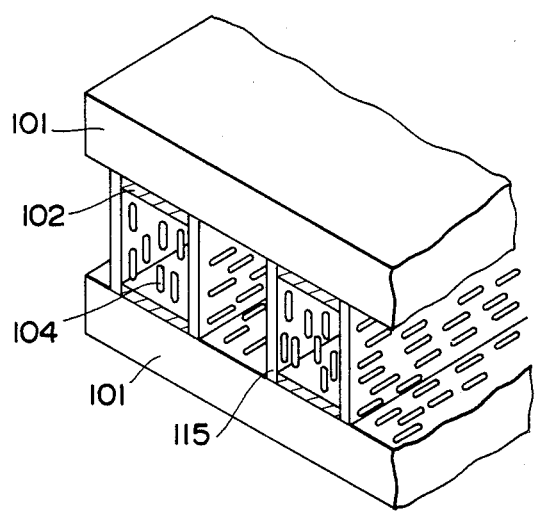
FIG. 7 is a schematic perspective view of the device shown in FIG. 6A.

FIG. 6A is a schematic cross-sectional view of a further embodiment of the optical modulation device in accordance with the present invention, while FIG. 6B is a diagram of distribution of the refractive index of the liquid crystal in the illustrated state of the optical modulation device shown in FIG. 6A. In addition, FIG. 7 is a perspective view of the optical modulation device shown in FIG. 6A.

In FIG. 6A, the optical modulation device in accordance with this embodiment has a phase diffraction grating which is arranged as follows: A liquid crystal 104 is disposed between the upper and lower substrates 101 provided with a plurality of the stripe-shaped electrodes 102. A partition wall 115 is provided at a boundary between the electrode portion which is provided with the stripe-shaped electrode 102 and the non-electrode portion which is not provided the same. The crystal liquid phase corresponding to each of the stripe-shaped electrodes 102 is partitioned from the adjacent liquid crystal phase by the partition walls 115.

In addition, since the liquid crystal 104 is sealed in the narrow space between the stripe-shaped electrode 102 or the substrate 101 and the partition wall 105, the director of the molecules of the liquid crystal is oriented in the direction in which the space continues.

Thus, the optical modulation device of this invention can omit an oriented film as compared with a conventional phase diffraction grating.

In the present invention, the partition wall is preferably formed of a film or a planar member formed of a transparent insulating substance. For instance, the partition wall is formed of a deep ultraviolet (Deep UV) resist material, an ultraviolet (UV) setting material, a thermosetting material, or an organic oxide such as $SiO_2$.

In addition, it is necessary for the thickness of the partition wall to be sufficiently smaller than the pitch of the phase diffraction grating or sufficiently smaller than the order of the wavelength of a visible ray. It is also necessary for a periodic distribution of the refractive index formed by the difference between the refractive indices of the partition wall and the liquid crystal not to undergo a diffraction phenomenon. Although it differs depending on the pitch of the phase diffraction grating, this periodic distribution of the refraction index is normally 0.5 $\mu$m or less, or preferably 0.3 $\mu$m or below.

In this embodiment, the thickness of the liquid crystal constituting the phase diffraction grating is normally 1–2 $\mu$m, or preferably 1.4–1.8 $\mu$m.

The liquid crystal used in this invention is not particularly restricted and one which is normally used as an optical modulation device may be used. However, a liquid crystal ($\Delta n = 0.2 - 0.3$) having a particularly large "$\Delta n = n_e - n_0$" is preferable.

In this embodiment, by providing a partition wall, it becomes possible to impart a far stronger orientation-restricting force than in a conventional case employing an oriented film alone, thereby making it possible to prevent the spreading of the electric field to the non-electrode portions.

For instance, if a nematic liquid crystal having a positive dielectric property is used, the non-electrode portions are orderly oriented in the direction horizontal to the partition walls and substrates by virtue of the strong orientation-restraining force of the partition wall in the direction of the grating. Meanwhile, the electrode portions are orderly oriented perpendicularly to the substrates in correspondence with the direction of the electric field applied. Consequently, it is possible to obtain a distribution of the refractive index which is rectangular-shaped with a sharp boundary, as shown in FIG. 6B.

Figure 8:
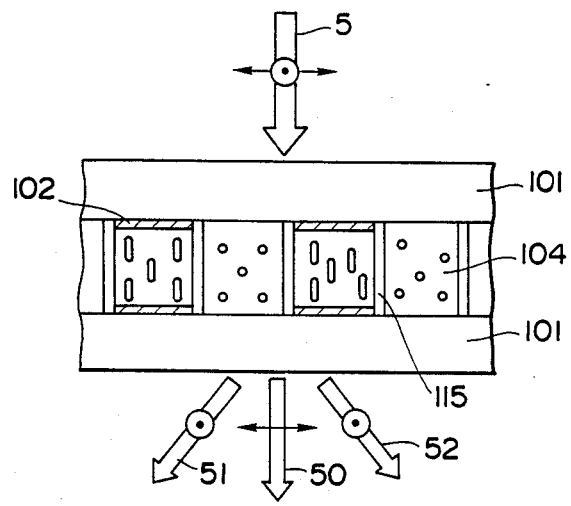
FIG. 8 is an explanatory diagram illustrating the basic principle of the modulation performed by the device shown in FIG. 6A.

Accordingly, as shown in FIG. 8, if the incident beam of light 5 is applied, a distribution of the refractive index of a sharp rectangular shape can be formed in the electrode portions provided with the stripe-shaped electrodes and the non-electrode portions not provided with them, by virtue of the orderly orientation of the molecules of the liquid crystal. Hence, it is possible to effect optical modulation having a high resolution of the incident beam of light.

In addition, since the electric field is prevented from spreading, it is possible to form a grating with very fine pitch.

Figure 9:
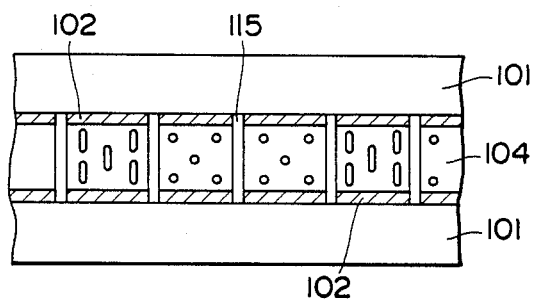
FIG. 9 is a schematic top plan view of a modification of the device shown in FIG. 6A.

As another example of the present invention, if an arrangement is provided such that, as shown in FIG. 9, the stripe-shaped electrode 102 is provided in each portion partitioned by the partition walls 115, and each of the liquid crystal layers is adapted to be driven independently, it becomes possible to set the pitch and the line to the space (a ratio between the width of an $n_0$ distribution and the width of an $n_e$ distribution) freely at an integral fold of the minimum pitch, so that the diffraction condition can be made variable.

For instance, if an optical modulation device having this arrangement is used as a display device, it becomes possible to obtain a light-transmissive-type variable-color display device which is transparent when the electric field is OFF and is capable of changing its display color by varying the refracting condition at the time when it is ON.

Description will be made hereafter of a specific embodiment of the optical modulation device shown in FIGS. 6A and 7.

The optical modulation device having the arrangement shown in FIG. 6A was prepared as follows. Partition walls each having a height of 1.5 $\mu$m and a thickness of 0.3 $\mu$m and constituted by a light-transmissive material such as $SiO_2$ are interposed between two glass substrates having a thickness of 0.3–0.7 mm and provided with ITO transparent electrodes having a stripe pitch of 1.5 $\mu$m and an electrode width of 0.75 $\mu$m. As the liquid crystal, TN403 (manufactured by ROCHE, $\Delta n=0.26$) was charged, and the thickness was of the liquid crystal phase was set to 1.5 μm.

When a 10–15 V A.C voltage was applied to this optical modulation device, optical modulation took place in the liquid crystal layers in the electrode portions and non-electrode portions, and modulation from 90% to 10% was attained in terms of the change in the zero-order light transmittance using a white light source.

As has been explained above, by providing partition walls between the electrode portions and non-electrode portions of the liquid crystal layers, the optical modulation device in accordance with this embodiment is capable of dividing the liquid crystal at regular pitches, imparting a strong orientation-restraining force, and preventing the spread of an electric field, thereby making it possible to obtain a rectangular-shaped distribution of the refractive index which has little disorder in the orientation and has sharp boundaries. Accordingly, there is an outstanding effect in that a phase diffraction grating-type optical modulation device capable of making the pitches very small can be realized.

As for the beam of light 5 which is modulated by the optical modulation device in accordance with this invention, i.e., light to be modulated, it is possible to use light of a desired form, such as white light and a laser beam.

In terms of applications of the optical modulation device of this type, applications to display devices in viewfinders of such as cameras are interesting.

In this case, the aforementioned light to be modulated becomes object light, which is transmitted through a pickup system of a camera, the light to be modulated undergoes modulation by this optical modulation device, and a display pattern is superposed on the image of an object which is observed through an eye-piece of the viewfinder.

Accordingly, in the state in which no driving energy, such as voltage, is supplied, the object light passes through this optical modulation device without stopping, so that the viewfinder constantly assumes a bright state. Therefore, it is possible to provide a display device which has a low level of power consumption and high reliability.

What is claimed is:

1. A liquid crystal optical modulation device comprising:

first and second substrates, at least one of said substrates being transparent;

a diffraction grating structure disposed between said first and second substrates, said diffraction grating structure being formed by alternately arranging an optical member and a liquid crystal layer having negative dielectric anisotropy in a plane substantially parallel to the substrate surfaces of said substrates; and applying means for applying an electric field substantially perpendicular to said substrate surfaces to said liquid crystal layer so as to change the refractive index of said liquid crystal layer;

wherein the liquid crystal molecules are arranged in a direction substantially perpendicular to said substrate surfaces and the refractive index of said optical member and that of said liquid crystal layer are substantially equal to each other with respect to an incident light entering into said device, when said electric field is not applied to said liquid crystal layer, and, by applying said electric field to said liquid crystal so as to change the arrangement direction of said liquid crystal molecules, said refractive indexes of said optical member and liquid crystal layer are changed to each other with respect to said incident light, thereby said incident light being diffracted by said structure.

2. A device according to claim 1, wherein said liquid crystal layer consists of a nematic liquid crystal.

3. A device according to claim 2, wherein said applying means arranges said liquid crystal molecules of said liquid crystal layer in a direction parallel to said substrate surfaces by applying said electric field having a predetermined intensity to said liquid crystal layer.

4. A liquid crystal optical modulation device comprising:

first and second substrates at least one of which is transparent;

a diffraction grating structure disposed between said first and second substrates, said structure being formed by alternately arranging an optical member consisting of a liquid crystal polymer material and a liquid crystal layer in a plane substantially parallel to the substrate surfaces of said substrates and the optical anisotropy of said optical member and that of said liquid crystal are substantially equal to each other; and applying means for applying an electric field substantially perpendicular to said substrate surfaces to said liquid crystal layer in order to change the refractive index of said liquid crystal layer, wherein the arrangement directions of the liquid crystal molecules of said liquid crystal layer and the directions of the molecule axes of said optical member are substantially equal to each other and the refractive index of said liquid crystal layer and that of said optical member are substantially equal to each other with respect to an incident light entering to said device, when said electric field is not applied to said liquid crystal layer, and said refractive index of said optical member with respect to said incident light is different from that of said liquid crystal layer by applying said electric field to said liquid crystal layer so as to change the arrangement directions of said liquid crystal molecules of said liquid crystal layer, thereby said incident light being diffracted by said structure.

5. A device according to claim 4, wherein said device is constructed in such a manner that said arrangement directions of said liquid crystal molecules of said liquid crystal layer and said molecule axes of said optical member are substantially parallel to said substrate surfaces when said electric field is not applied to said liquid crystal layer.

6. A device according to claim 5, wherein said liquid crystal layer consists of a nematic liquid crystal having positive dielectric anisotropy.

7. A device according to claim 6, wherein said applying means arranges said liquid crystal molecules of said liquid crystal layer in a direction perpendicular to said substrate surfaces by applying said electric field having a predetermined intensity.

8. A device according to claim 4, wherein said optical member consists of an aromatic copolyester.

* * * * *

UNITED STATES PATENT AND TRADEMARK OFFICE
CERTIFICATE OF CORRECTION

PATENT NO. : 4,850,681

DATED : July 25, 1989

INVENTOR(S) : MASAO YAMANOBE, ET AL.

Page 1 of 2

It is certified that error appears in the above-identified patent and that said Letters Patent is hereby corrected as shown below: Title page:

IN [75] INVENTORS

"Masao Yamanobe," should read --Masato Yamanobe,--.

IN [56] REFERENCES CITED

U.S. PATENT DOCUMENTS, "Wissburn et al." should read --Wissbrun et al.--.

COLUMN 3

Line 56, "70" should read --61--.

COLUMN 6

Line 6, "1," should read --31,--.
Line 15, "polarizing components 6, 61" should read --polarizing components 60, 61--.

COLUMN 7

Line 36, "FIG. 2A," should read --FIG. 3A,--.
Line 47, "liquid crystal 12," should read --liquid crystal 11,--.
Line 61, "liquid crystal 1," should read --liquid crystal 11,--.

COLUMN 9

Line 44, "switch 127" should read --switch 107--.

UNITED STATES PATENT AND TRADEMARK OFFICE
CERTIFICATE OF CORRECTION

PATENT NO. : 4,850,681
DATED : July 25, 1989
INVENTOR(S) : MASAO YAMANOBE, ET AL.

It is certified that error appears in the above-identified patent and that said Letters Patent is hereby corrected as shown below:

COLUMN 10

Line 32, "subjectses 101" should read --substrates 101--.

COLUMN 12

Line 12, "substrate 10" should read --substrate 101--.
    Line 21, "substrates 1)" should read --substrate 101--.

COLUMN 16

Line 4, "rection" should read --rections--.
    Line 40, "tering to" should read --tering--.

Signed and Sealed this

Twenty-sixth Day of June, 1990

Attest:

HARRY F. MANBECK, JR.

Attesting Officer      Commissioner of Patents and Trademarks